(12) United States Patent
Song et al.

(10) Patent No.: US 8,750,337 B2
(45) Date of Patent: *Jun. 10, 2014

(54) APPARATUS AND METHOD FOR MANAGING A PREFERENCE CHANNEL IN A MOBILE BROADCAST SYSTEM

(75) Inventors: Young-Joo Song, Suwon-si (KR);
Ki-Ho Jung, Gwacheon-si (KR);
Young-Kwon Lim, Goyang-si (KR);
Je-Chang Jeong, Seoul (KR);
Kook-Heui Lee, Yongin-si (KR);
Jae-Hyun Park, Suwon-si (KR)

(73) Assignees: Samsung Electronics Co., Ltd., Suwon-si (KR); Industry-University Cooperation Foundation Hanyang University, Seoul (KR)

( * ) Notice: Subject to any disclaimer, the term of this patent is extended or adjusted under 35 U.S.C. 154(b) by 1137 days.

This patent is subject to a terminal disclaimer.

(21) Appl. No.: 11/581,083

(22) Filed: Oct. 16, 2006

(65) Prior Publication Data

US 2007/0093263 A1  Apr. 26, 2007

(30) Foreign Application Priority Data

Oct. 14, 2005 (KR) .................. 10-2005-0097240
Jan. 13, 2006 (KR) .................. 10-2006-0004151

(51) Int. Cl.
*H04J 3/04* (2006.01)

(52) U.S. Cl.
USPC ..................... 370/536; 370/329; 370/417

(58) Field of Classification Search
USPC ................... 455/3.01–3.04; 370/329
See application file for complete search history.

(56) References Cited

U.S. PATENT DOCUMENTS

| | | | |
|---|---|---|---|
| 6,269,245 B1* | 7/2001 | Li et al. ................ | 455/450 |
| 6,985,188 B1* | 1/2006 | Hurst, Jr. ............... | 348/553 |
| 7,199,836 B1* | 4/2007 | Eleftheriadis et al. ... | 348/578 |
| 2003/0106069 A1* | 6/2003 | Crinon ................ | 725/134 |
| 2004/0028066 A1* | 2/2004 | Quanbeck et al. ....... | 370/412 |
| 2004/0221306 A1* | 11/2004 | Noh .................. | 725/44 |
| 2005/0289589 A1* | 12/2005 | Vermola .............. | 725/35 |
| 2006/0044163 A1* | 3/2006 | Fujii ................. | 341/50 |
| 2006/0277582 A1* | 12/2006 | Kiiskinen et al. ....... | 725/89 |
| 2007/0067815 A1* | 3/2007 | Bowen et al. .......... | 725/99 |
| 2007/0101228 A1* | 5/2007 | Vesma et al. .......... | 714/752 |
| 2009/0168902 A1* | 7/2009 | Kisoda et al. ......... | 375/240.27 |

FOREIGN PATENT DOCUMENTS

| | | |
|---|---|---|
| KR | 10-2000-0055871 A | 9/2000 |
| KR | 10-2005-0025790 A | 3/2005 |

* cited by examiner

*Primary Examiner* — German J Viana Di Prisco
(74) *Attorney, Agent, or Firm* — Roylance, Abrams, Berdo & Goodman, LLP (57) ABSTRACT

An apparatus and method for managing a preference channel are provided which can reduce a delay time when a channel change is made between preference channels, by storing a preference channel directly selected by a mobile terminal user in a mobile broadcast system. A mobile terminal receives and demultiplexes multiplexed logical channels on which data streams are transmitted from a service provider through a communication network. Preference channels of the demultiplexed logical channels are dynamically allocated to decoding buffers using stored information. A decoding time at which data of the decoding buffers is accessed and decoded is computed using reference information. A decoding operation is performed at the computed decoding time, and decoded channel-by-channel elementary streams are stored in a memory. The decoded channel-by-channel elementary streams stored in the memory are displayed on a screen of the mobile terminal.

14 Claims, 8 Drawing Sheets

```
class preferChannelDescriptor {
    bit(8) number_of_channel
    for(i=0; i<number_of_channel; i++){
        bit(12) streamID ;
        bit(8) preference ;
    }
}
```

APPARATUS AND METHOD FOR MANAGING A PREFERENCE CHANNEL IN A MOBILE BROADCAST SYSTEM

CROSS-REFERENCE TO RELATED PATENT APPLICATION

This application claims the benefit under 35 U.S.C. §119 (a) to Korean Patent Applications filed in the Korean Intellectual Property Office on Oct. 14, 2005 and Jan. 13, 2006, and assigned Serial Nos. 2005-97240 and 2006-4151, respectively, the entire discloses of both of which are hereby incorporated by reference.

BACKGROUND OF THE INVENTION

1. Field of the Invention

The present invention generally relates to a mobile broadcast system. More particularly, the present invention relates to an apparatus and method for managing a preference channel based on Lightweight Application Scene Representation (LASeR) in a mobile broadcast system.

2. Description of the Related Art

Lightweight Application Scene Representation (LASeR) is a format of multimedia content for a simple multimedia service in terminals such as mobile phones suffering from resource shortages. The LASeR may be a sub-set of a Moving Picture Experts Group-4 Binary Format for Scene (MPEG-4 BIFS). The BIFS is a scene description standard for all multimedia contents and the LASeR is a scene description standard for multimedia terminals such as mobile phones in which a display size and a network bandwidth are small.

The BIFS is used for an object-based system. In the object-based system, multimedia is a set of objects. Accordingly, temporal and spatial information of each of the media needs to be indicated. For example, in the case of a weather forecast, four objects such as a weather caster, a weather chart displayed behind the weather caster, speech of the weather caster, and background music can be considered. When multiple objects are present independently, an appearing time, disappearing time and position of each object should be defined to describe one scene. This definition is the BIFS. Because related information is stored in a binary file according to the BIFS, the storage capacity is reduced.

However, the BIFS has a large amount of data of about 200 pages as described in the MPEG-4 system standard document (International Organization for Standardization/International Electro-technical Commission (ISO/IEC) 14496-1). Thus, in communication environments suffering from the shortage of available resources as in mobile terminals, there is a difficulty in using the BIFS. An alternative plan is to use the LASeR. The LASeR is the technology developed for free representations of various multimedia and interactions with users in mobile terminals with limited memory and power by performing multiplexing and synchronization processes for different elementary streams (ESs) such as a LASeR scene description, video, audio, image, font, and metadata, and minimizing complex requirements.

The LASeR ES is constructed with an access unit (AU) including a command. The command is used to change a scene characteristic at a particular time. Simultaneous commands are grouped in one AU. The AU may be one scene image, short sound, one graphic image, or short animation. The commands are Insert, Replace, Delete, Background, Save, Clean, and the like. The LASeR may be referred to as the standard needed to express a commercial film (CF) in which images vary with very complex elements. A LASeR browser displays ESs in designated order. The hierarchy is present between the ESs. The LASeR browser displays scenes in order of: (1) packet reception, (2) packet decoding (AU-by-AU recovery of one image, one video clip, and the like), (3) command execution, (4) audio/video object rendering, (5) user interaction (selection, dragging, and the like), and (6) local connection or connection with an external information source.

Figure 1:
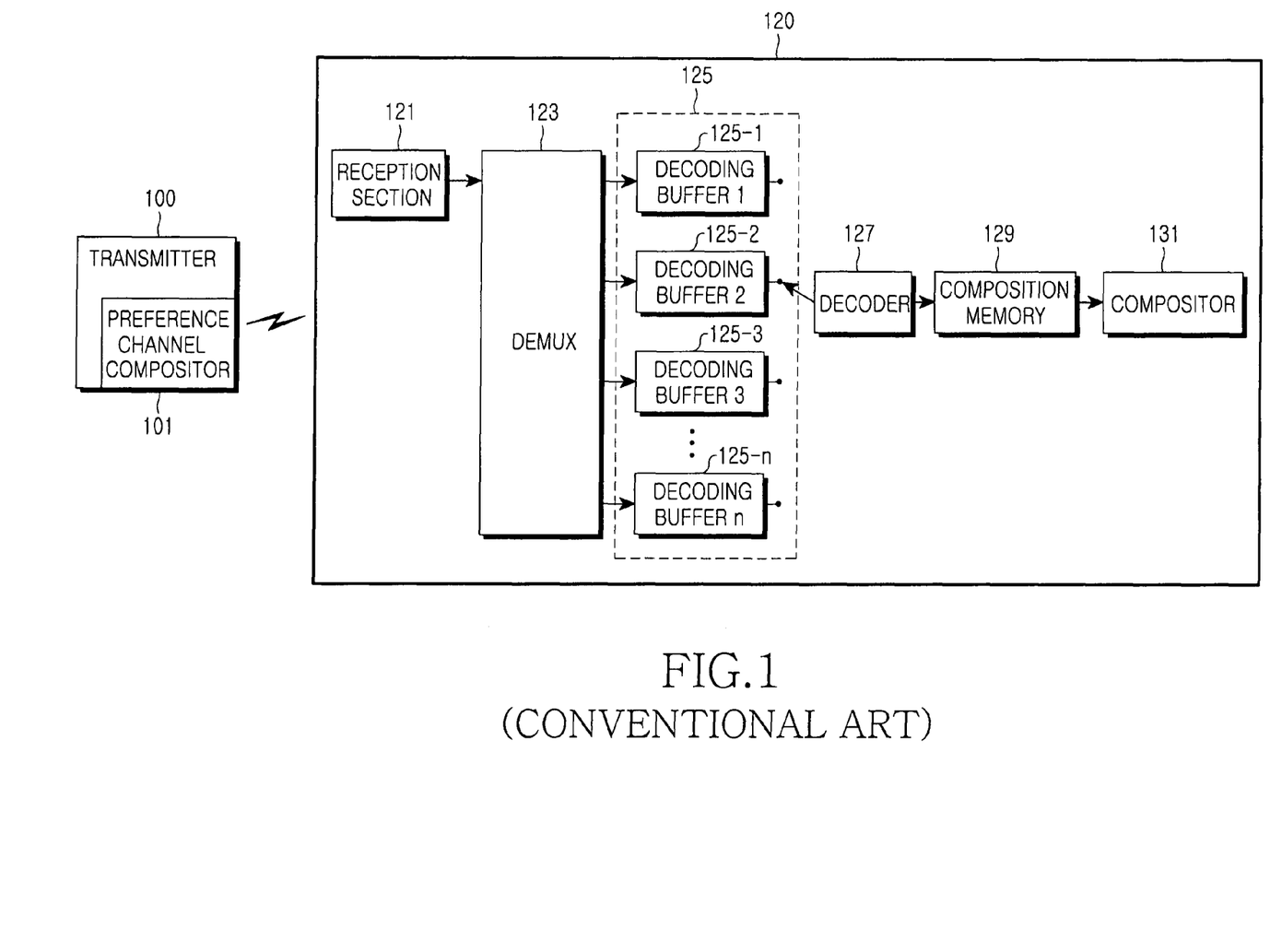
FIG. 1 is a block diagram illustrating a multi-stream transceiver in a conventional mobile broadcast system.

FIG. 1 is a block diagram illustrating a multi-stream transceiver in a conventional mobile broadcast system. A conventional preference channel composition method based on the LASeR will be described with reference to FIG. 1.

In FIG. 1, a transmitter 100 is a server of a broadcast provider and a receiver 120 is a mobile terminal for receiving a mobile broadcast service.

The conventional transmitter 100 includes a preference channel compositor 101. The preference channel compositor 101 of the transmitter 100 composes multiple channels designated by the broadcast provider in one image and transmits the image on an additional channel. Then, a mobile terminal user can retrieve the multiple channels in service from one image of the receiver 120 and can select a channel designated by the broadcast provider. The receiver includes a reception section 121, a demultiplexer 123, decoding buffers 125, a decoder 127, a composition memory 129 and a compositor 131.

In this preference channel composition method, the mobile terminal user cannot directly select his/her preference channel. That is, the mobile terminal user cannot select a channel according to his/her intention, preference and taste.

Figure 2:
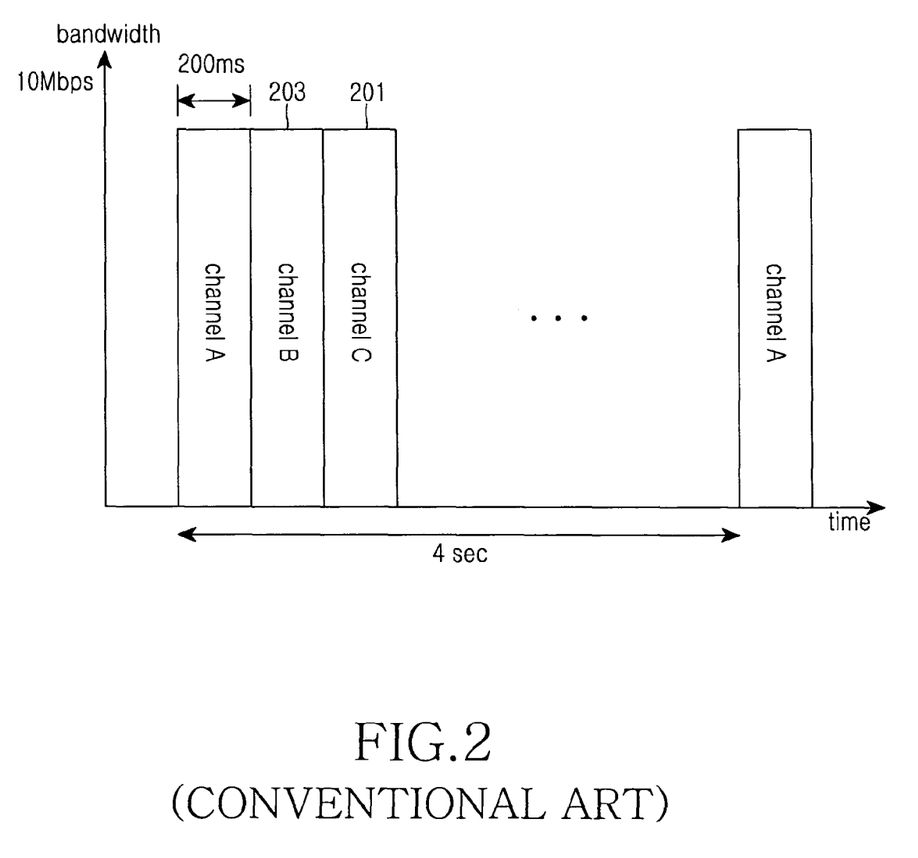
FIG. 2 illustrates a delay time due to channel switching in the conventional mobile broadcast system.

FIG. 2 illustrates a delay time due to channel switching in the conventional mobile broadcast system. An amount of delay time occurring at the channel switching time will be described with reference to FIG. 2.

In the mobile broadcast system, power consumption of a data reception section (not illustrated) for receiving data significantly affects that of a terminal. To address this problem, the mobile broadcast system such as a digital video broadcast-handheld (DVB-H) system periodically transmits data and operates the data reception section when desired data is transmitted. In other cases, the data reception section does not operate according to a time slicing scheme, such that power consumption is reduced. System parameters as shown in Table 1 are considered according to DVB-H implementation guideline.

TABLE 1

| System Parameters | Values |
|---|---|
| Channel bandwidth | 8 MHz |
| Data transmission rate | 10 Mbps |
| Error correction (MPE-FEC buffer) size | 2 Mbits |
| Data transmission rate per channel | 500 Kbps |

A delay time occurring at the channel switching time is computed by system parameters as shown in Table 1.

Assuming that the time occupied by one channel is 200 ms required to transmit 2 Mbits and a total of 20 channels are present, a transmission period becomes 4 sec. as illustrated in FIG. 2.

At this time, the time required to switch a channel in the mobile broadcast system such as the DVB-H system is a sum of a waiting time until an associated channel transmission period is reached and a time required to search for and decode an I-frame of video data from an associated channel. As illustrated in FIG. 2, when a change to channel-B 203 is made while channel-C 201 is received, a transmission time of a maximum of 4 sec corresponding to the channel transmission period is required. In this case, when the transmission time of 4 sec is added to 2 sec corresponding to the time required to start decoding after searching for the I-frame of the video, a delay time occurring at the channel switching time becomes a total of 6 sec. Thus, when a channel is switched, the mobile terminal user feels tedium due to the delay time.

Accordingly, there is a need for an improved apparatus and method for reducing a delay time in a mobile broadcast system when a channel is switched in a mobile broadcast system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for managing a preference channel that can select the preference channel according to intention, preference and taste of a mobile terminal user in a mobile broadcast system.

It is another aspect of exemplary embodiments of the present invention to provide an apparatus and method for managing a preference channel that can efficiently allocate decoding buffers of a mobile terminal according to a number of preference channels in a mobile broadcast system.

It is another aspect of exemplary embodiments of the present invention to provide an apparatus and method for managing a preference channel that can minimize a delay time when a channel change is made between preference channels in a mobile broadcast system.

It is yet another aspect of exemplary embodiments of the present invention to provide an apparatus and method for managing a preference channel that can provide users with smooth services by minimizing a delay time when a channel change is made between preference channels in a mobile broadcast system.

In accordance with an aspect of exemplary embodiments of the present invention, there is provided a method for managing a preference channel in a mobile broadcast system, in which multiplexed logical channels on which data streams are transmitted are received and demultiplexed from a service provider to a mobile terminal through a communication network, preference channels of the demultiplexed logical channels are dynamically allocated to decoding buffers using stored information, a decoding time at which data of the decoding buffers is accessed and decoded is computed using reference information, a decoding operation is performed at the computed decoding time, and decoded channel-by-channel elementary streams are stored in a memory, and the decoded channel-by-channel elementary streams stored in the memory are displayed on a screen of the mobile terminal.

In accordance with another aspect of the present invention, there is provided an apparatus for managing a preference channel in a mobile broadcast system, in which a demultiplexer receives and demultiplexes multiplexed logical channels on which data streams are transmitted from a service provider to a mobile terminal through a communication network, a preference channel manager dynamically allocates preference channels of the demultiplexed logical channels to decoding buffers using stored information, a decoder computes a decoding time at which data of the decoding buffers is accessed and decoded using reference information and performs a decoding operation at the computed decoding time, a memory stores decoded channel-by-channel elementary streams, and a compositor displays the decoded channel-by-channel elementary streams stored in the memory on a screen of the mobile terminal.

BRIEF DESCRIPTION OF THE DRAWINGS

The above and other objects, features and advantages of certain exemplary embodiments of the present invention will be more clearly understood from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention propose an apparatus and method for allowing a mobile terminal user to directly select a preference channel without retrieving multiple channels in service from one image of a receiver and selecting a channel designated by a broadcast provider.

The exemplary embodiments of the present invention propose an apparatus and method that can reduce a delay time when a preference channel is switched.

Figure 3:
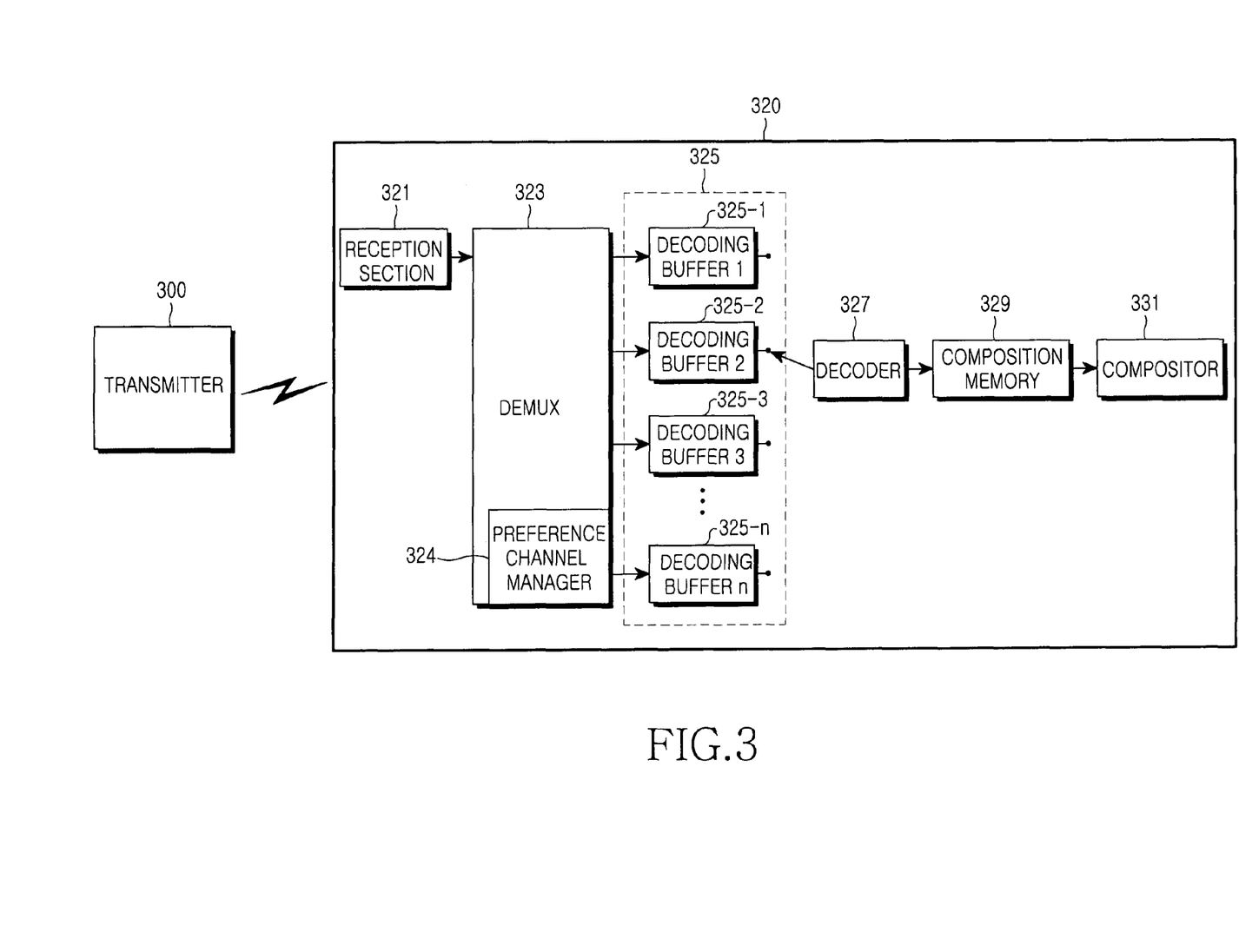
FIG. 3 is a block diagram illustrating a multi-stream transceiver in a mobile broadcast system in accordance with an exemplary embodiment of the present invention.

FIG. 3 is a block diagram illustrating a multi-stream transceiver in a mobile broadcast system in accordance with an exemplary embodiment of the present invention. An apparatus and method for managing a preference channel in the mobile broadcast system will be described with reference to FIG. 3.

In the prior art as illustrated in FIG. 1, the preference channel compositor 101 of the transmitter 100 composes preference channels designated by a broadcast provider and transmits an image of the preference channels to the receiver 120. However, in the present invention as illustrated in FIG. 3, the preference channel compositor 101 of the transmitter 100 is removed from a transmitter 300, and a preference channel manager 324 is added to a demultiplexer 323 of a receiver 320. In an exemplary implementation, the mobile terminal user can directly select a preference channel according to his/her intention, preference and taste without retrieving multiple channels in service from one image of the receiver 320 and selecting a channel designated by the broadcast provider.

In FIG. 3, a reception section 321 receives multiplexed logical channels on which data streams are transmitted from the service provider and then outputs the received multiplexed logical channels to the demultiplexer 323. The demultiplexer 323 separates the received multiplexed logical channels and dynamically allocates the separated logical channels to decoding buffers 325 using preference channel description information of the preference channel manager 324. The preference channel description information will be described below with reference to FIG. 4.

Figure 4:
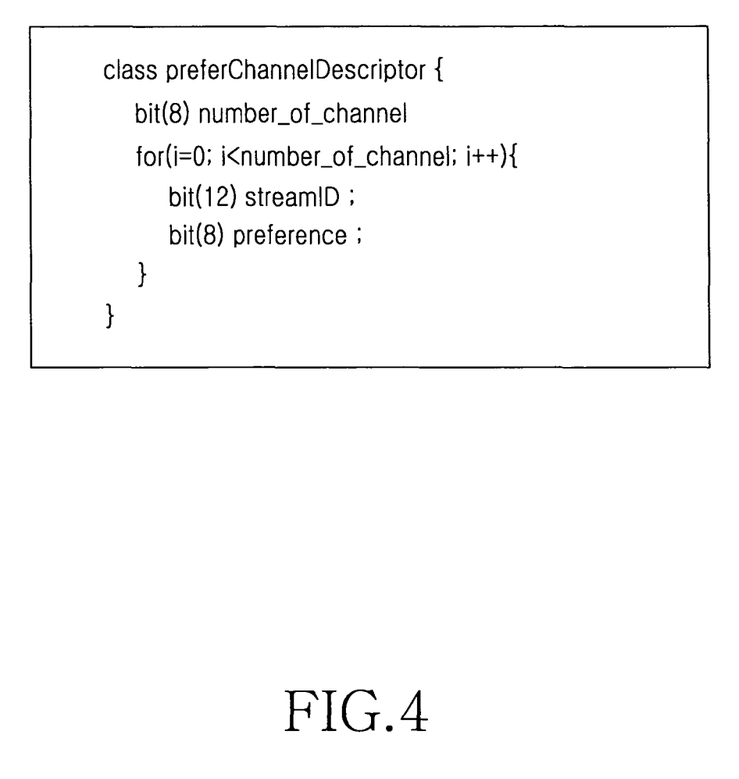
FIG. 4 illustrates preference channel description information in the mobile broadcast system in accordance with an exemplary embodiment of the present invention.

The preference channel manager 324 within the demultiplexer 323 stores the preference channel description information defined as illustrated in FIG. 4.

Herein, it should be noted that the preference channel manager 324 can be configured inside or outside the demultiplexer 323.

FIG. 4 illustrates the preference channel description information in the mobile broadcast system in accordance with an exemplary embodiment of the present invention.

As illustrated in FIG. 4, the preference channel description information is channel-by-channel stream identifiers (IDs), a user preference and a number of preference channels.

A stream ID is the unique ID of each video stream.

The user preference indicates a value of a preference for a channel. If the preference value is large, it means that the user preference is high.

The number of preference channels (or number_of_channel) is used when the separated logical channels are allocated from the demultiplexer 323 to the decoding buffers 325.

Next, the decoding buffers 325 and a decoder 327 of FIG. 3 according to user preference channels will be described.

To reduce the delay time when a channel is switched, the decoding buffers 325 can be flexibly configured (or allocated) according to the number of preference channels of the mobile terminal user. As a preference channel is received, regardless of channel viewing, the delay time can be reduced when a channel change is made between the preference channels. Because the preference channels are already stored in the decoding buffers 325, the channel change does not need to be delayed by a channel transmission period when the channel is switched. For example, the channel transmission period is the time required for searching for a news channel of Korean Broadcasting System (KBS) when a channel change is made from a drama channel of Munhwa Broadcasting Corporation (MBC) to the KBS news channel.

That is, when the mobile terminal user requests a change to a different channel within the preference channels, the decoding operation is immediately started because the preference channels are already stored in the decoding buffers. Since the waiting time of 4 sec. until an associated channel transmission period is reached is not needed, the channel switching time can be shortened from 6 sec. to 2 sec.

Figure 5:
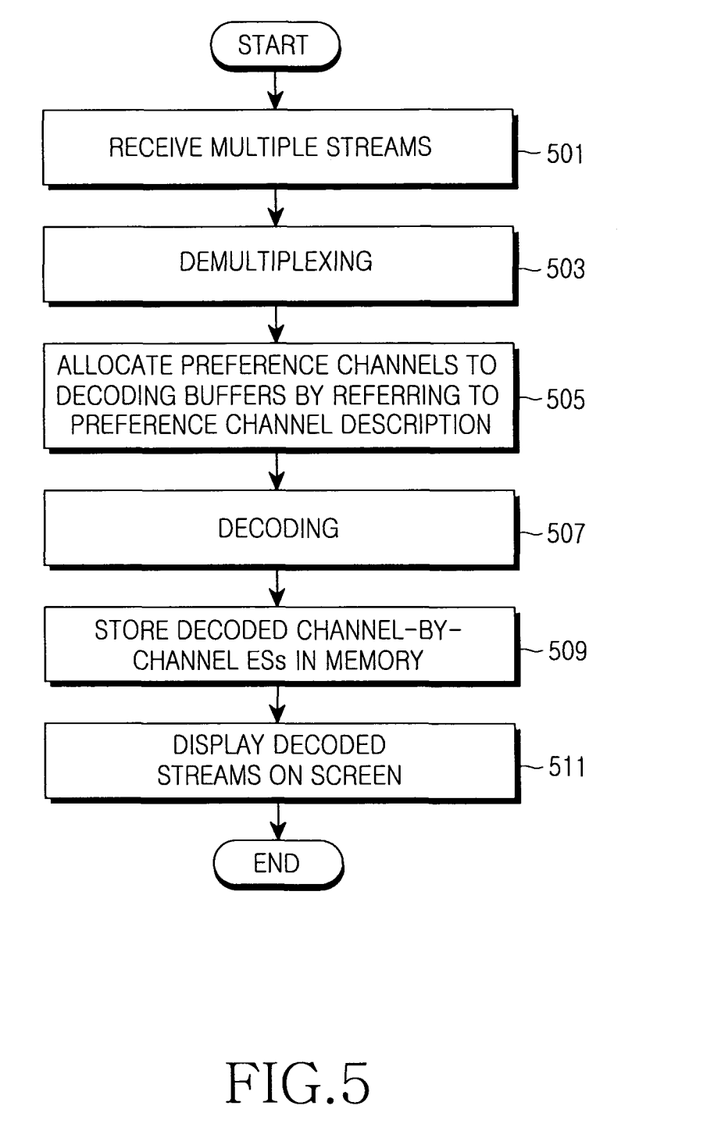
FIG. 5 is a flowchart illustrating a preference channel management method in the mobile broadcast system in accordance with an exemplary embodiment of the present invention.

FIG. 5 is a flowchart illustrating a preference channel management method in the mobile broadcast system in accordance with an exemplary embodiment of the present invention. The preference channel management method in the mobile broadcast system in accordance with an exemplary embodiment of the present invention will be described with reference to FIG. 5.

In step 501, the reception section 321 receives multiplexed logical channels on which data streams of a service provider are transmitted and then outputs the received multiplexed logical channels to the demultiplexer 323. Then, the demultiplexer 323 separates the logical channels transmitted on one physical channel in step 503. At this time, the demultiplexer 323 dynamically allocates preference channels to the decoding buffers 325 by referring to a preference channel description stored in the preference channel manager 324 configured inside the demultiplexer 323 in step 505. The decoder 327 decodes a preference channel selected by the mobile terminal user from among the channels stored in the decoding buffers 325 in step 507 and then outputs the decoded channel to a composition memory 329. Herein, the time at which the decoder 327 accesses the decoding buffers 325 will be described with reference to FIGS. 6, 7A and 7B. The composition memory 329 stores channel-by-channel ESs and then outputs the stored ESs to a compositor 331 in step 509. The compositor 331 displays a frame of each decoded channel stored in the composition memory 329 on a screen in step 511.

Figure 6:
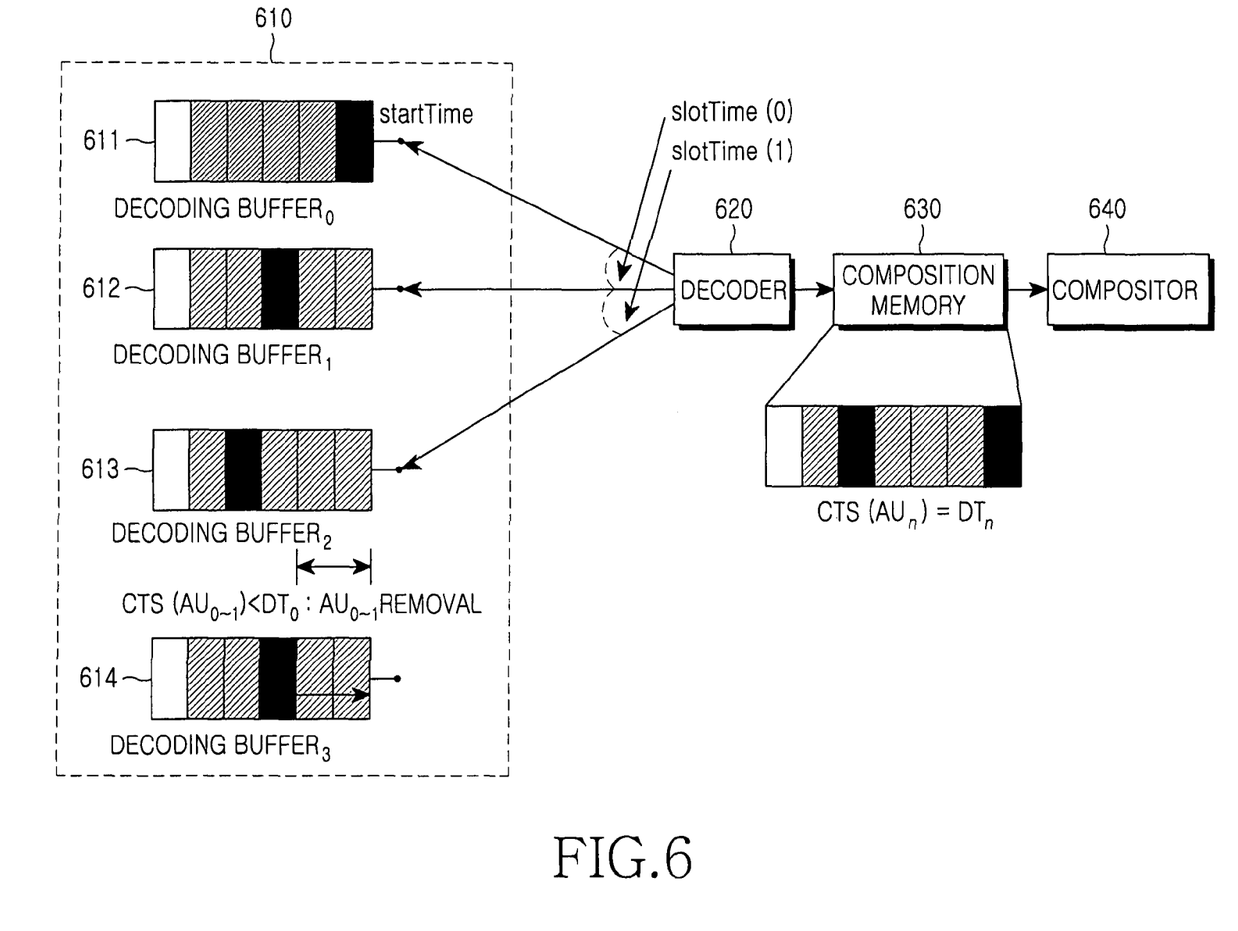
FIG. 6 illustrates a method for computing a decoding time related to a decoding buffer in the mobile broadcast system in accordance with an exemplary embodiment of the present invention.

The decoding time at which the decoder 327 accesses and decodes data of the decoding buffers 325 and the decoding time related to each of the decoding buffers 325 will be described with reference to FIGS. 6, 7A and 7B. FIG. 6 illustrates a method for removing AUs from decoding buffers or adjusting a decoding position by computing a decoding time in each of the decoding buffers in accordance with an exemplary embodiment of the present invention.

In a method for computing an ES decoding time related to each of the decoding buffers 610, a decoding time can be computed from information regarding a start time at which the first AU starts to be decoded, a period time of a grouping description, and a slot time.

The period time of the description is the time required to decode each ES included in a source list once.

The slot time is a decoding time allocated to each ES.

Because a decodable frame (indicated by a black box) in an associated stream of a first decoding buffer 611 of FIG. 6 is placed at a front end thereof, it can be immediately decoded. Because a decoding time is equal to the current time, the first decoding buffer 611 directly shifts a decodable AU to an access point.

Because a decodable frame (indicated by a black box) in an associated stream of a second decoding buffer 612 is placed in the third position from a front end thereof, it cannot be immediately decoded. In this case, a decoding time should be computed. A method for computing the decoding time is as follows.

A first decoding time is computed in the second decoding buffer 612. The first decoding time is computed as shown in Equation (1).

$$DT_0(S1) = \text{startTime} + \text{slotTime}(0) \quad \text{Equation (1)}$$

In an exemplary implementation, $DT_0$ is the first decoding time, startTime is the time at which the first AU starts to be decoded, slotTime is a decoding time allocated to each ES, and S1 is a stream.

After the first decoding time is computed, the n-th decoding time is computed. The n-th decoding time is computed as shown in Equation (2).

$$DT_n(S1) = DT_{n-1} + \text{periodTime} \quad \text{Equation (2)}$$

Herein, $DT_n$ is the n-th decoding time, $DT_{n-1}$ is the (n−1)-th decoding time, and periodTime is a period time required to decode each ES included in a source list once.

Because a decodable frame (indicated by a black box) in an associated stream of a third decoding buffer 613 is placed in the fourth position from a front end thereof, it cannot be immediately decoded. When an AU incapable of being immediately decoded at a decoding time is present among AUs of the third decoding buffer 613 (that is, $CTS(AU_{0\sim1})<DT_0$), the third decoding buffer 613 removes the associated AUs ($AU_{0\sim1}$) even though a time designated by a composition time stamp (CTS) is not reached. Herein, the CTS refers to a time stamp indicating a time at which data is displayed on the mobile terminal. The CTS information is the basic information at the time of video coding. Thus, the mobile terminal can detect the CTS information at the decoding time.

Because a decodable frame (indicated by a black box) in an associated stream of a fourth decoding buffer 614 is placed in the third position from a front end thereof, it cannot be immediately decoded. Thus, at an associated decoding time (indicated by a black box), an AU with a smallest CTS value among buffer AUs is set to an AU to which random access can be performed. Accordingly, $AU_{0\sim1}$ is removed from the fourth decoding buffer 614 of FIG. 6 and $AU_2$ is set to an access point.

Figure 7A:
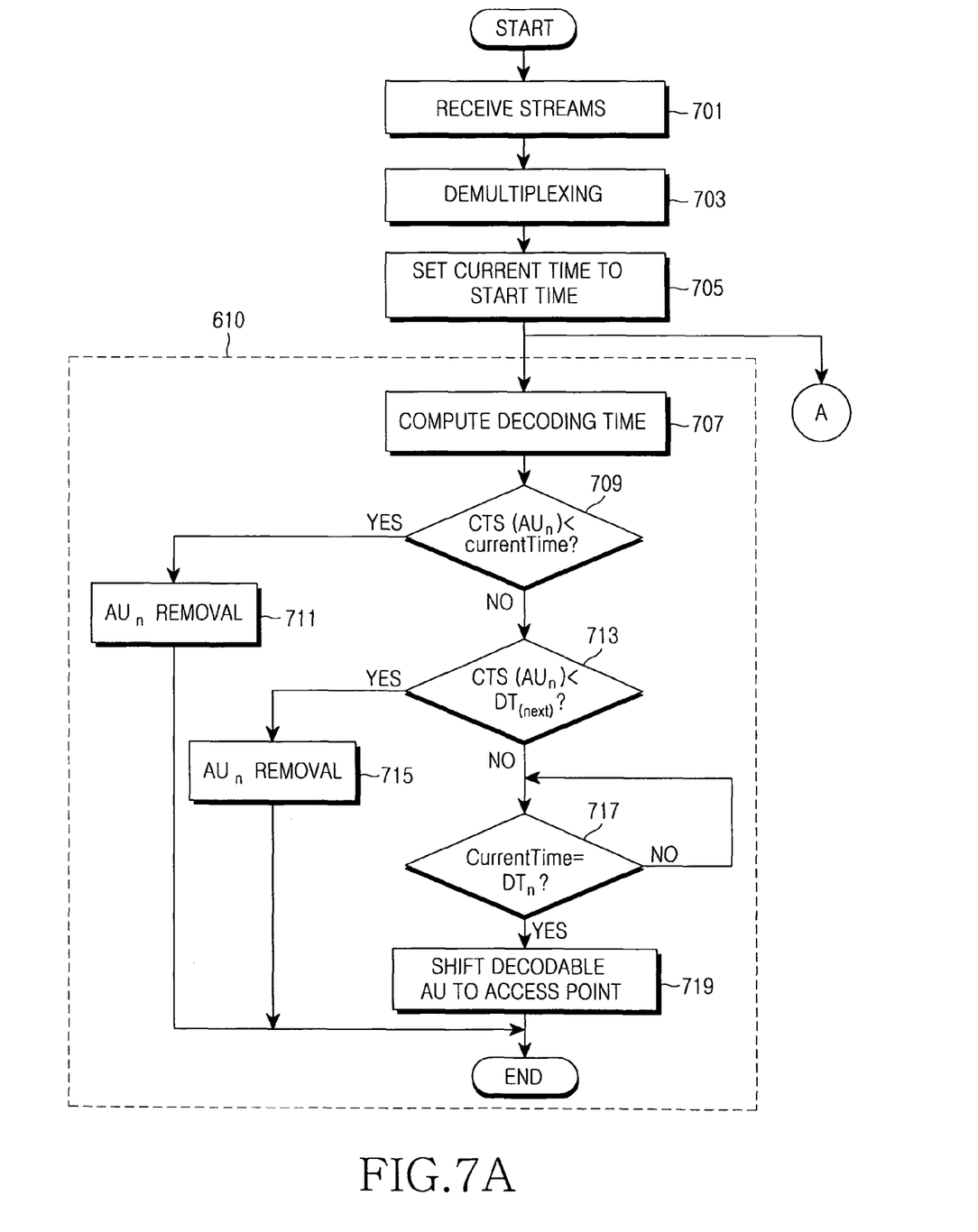
FIGS. 7A and 7B are flowcharts illustrating an operation of a receiver in the mobile broadcast system in accordance with an exemplary embodiment of the present invention.
Figure 7B:
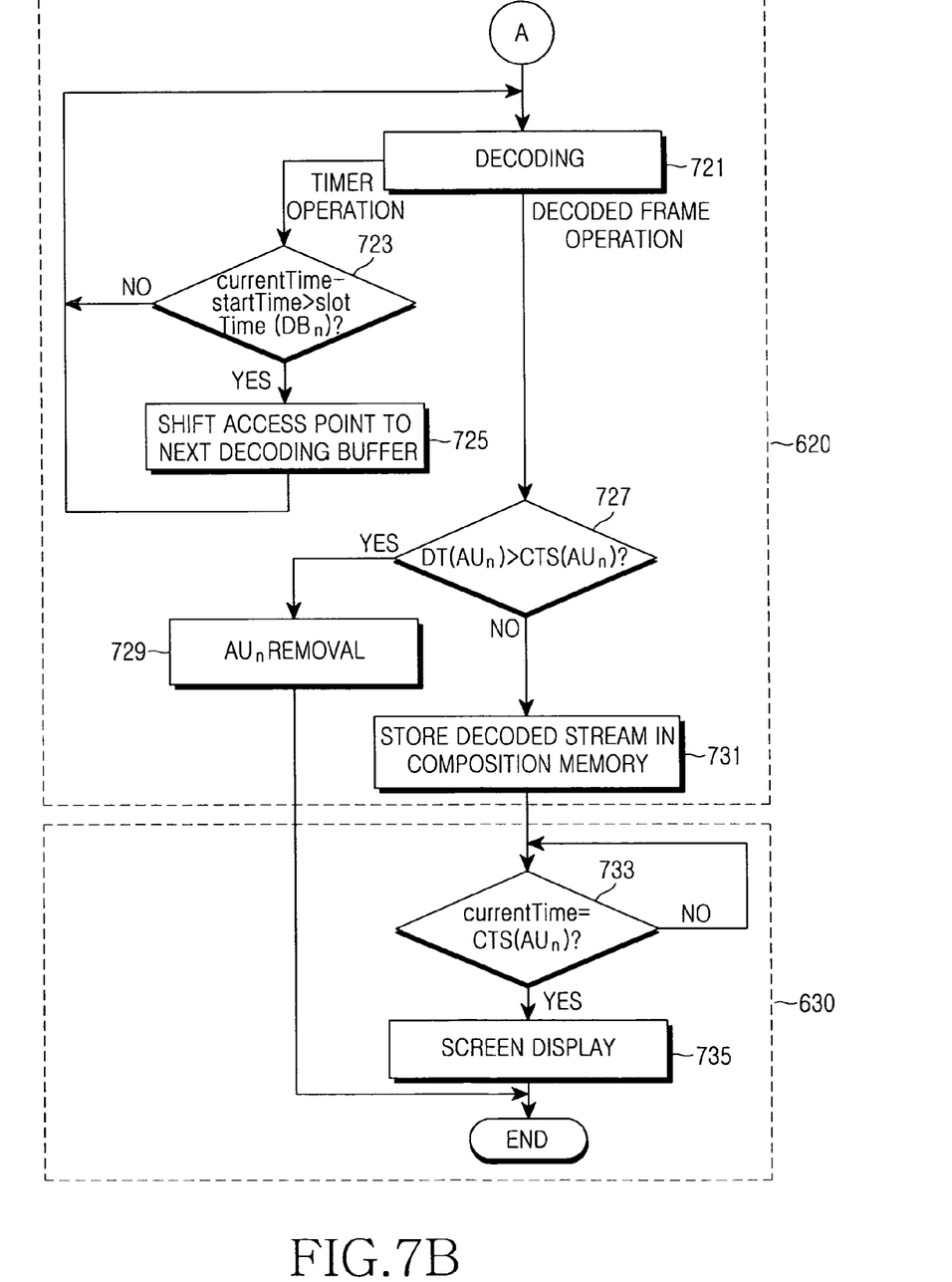

FIGS. 7A and 7B are flowcharts illustrating a multi-stream decoding method in accordance with an exemplary embodiment of the present invention.

Referring to FIG. 7A, the receiver receives media streams multiplexed into one physical channel in step 701. Then, the receiver separates the received multiplexed media streams into multiple logical channels through the demultiplexer 323, dynamically allocates the logical channels to the decoding buffers 610, and performs a waiting operation in step 703. When a decoder 620 starts a decoding operation, the receiver sets the current time to a decoding start time in step 705.

Next, the operations of the decoding buffers 610, the decoder 620, and a composition memory 630 will be described. First, the operation of the decoding buffers 610 will be described. In step 707, an associated decoding time is computed by referring to a start time corresponding to a first decoding time, a period time of a description defined in the present invention, and a slot time. The first decoding time is computed as shown in Equation (1) and the associated decoding time is computed as shown in Equation (2).

The following operation is performed so that the decoding buffers 610 can set an AU with a smallest CTS value among buffer AUs to an AU to which random access can be performed after the decoding time is computed.

First, the decoding buffers 610 determine whether CTS ($AU_n$) is less than the current time in step 709. If $CTS(AU_n)$ is less than the current time, the decoding buffers 610 remove $AU_n$ in step 711. However, if $CTS(AU_n)$ is equal to or more than the current time, the decoding buffers 610 determine whether $CTS(AU_n)$ is less than the next decoding time $DT_{next}$ in step 713. If $CTS(AU_n)$ is less than the next decoding time $DT_{next}$, the decoding buffers 610 remove $AU_n$ in step 715. However, if $CTS(AU_n)$ is equal to or more than the next decoding time $DT_{next}$, the decoding buffers 610 determine whether the current time is the associated decoding time $DT_n$ in step 717. If the current time is not the associated decoding time $DT_n$, step 717 is repeated. That is, until the associated decoding time $DT_n$ is reached, step 717 is repeated. However, if the current time is the associated decoding time $DT_n$, the decoding buffers 610 directly shift a decodable AU to an access point in step 719.

On the other hand, when the current time is set to the decoding start time in step 705, the decoder 620 starts the decoding operation in step 721 as illustrated in FIG. 7B. Next, the decoding operation divided into a timer operation and a decoded frame operation will be described.

First, in the timer operation, the decoder 620 performs the decoding operation during a slot time of an associated stream in each of the decoding buffers 610. At this time, the decoder 620 determines whether a difference between the current time and the start time is more than the slot time in step 723. It should be noted that the subject of the determination can be the decoder 620 in accordance with an exemplary embodiment of the present invention or a controller (not illustrated). The difference between the current time and the start time is a progress time of decoding. If the difference between the current time and the start time is less than or equal to the slot time, the process returns to step 721. However, if the difference between the current time and the start time is more than the slot time, the decoding operation on the associated decoding buffer is stopped. Thus, the decoder 620 shifts the access point to the next decoding buffer in step 725. When the access point is shifted to the next decoding buffer, the decoder 620 performs the decoding operation during the slot time of the associated stream in the associated decoding buffer in step 721.

Next, the decoded frame operation of the decoder 620 will be described.

In step 727, the decoder 620 determines whether an associated decoding time $DT_n(AU_n)$ is more than $CTS(AU_n)$. If the associated decoding time $DT_n(AU_n)$ is more than $CTS(AU_n)$, the decoder 620 proceeds to step 729 to remove $AU_n$ and stop the decoding operation. However, if the associated decoding time $DT_n(AU_n)$ is less than or equal to $CTS(AU_n)$, the decoder 620 stores a decoded stream in the composition memory 630 in step 731.

Next, the operation of the composition memory 630 will be described.

The composition memory 630 determines whether the current time is equal to $CTS(AU_n)$ in step 733. If the current time is not equal to $CTS(AU_n)$, step 733 is repeated. However, if the current time is equal to $CTS(AU_n)$, media stored in the composition memory 630 are displayed on the screen through a compositor 640 in step 735.

As is apparent from the above description, the present invention has the following effects.

The exemplary embodiments of the present invention can select a preference channel according to intention, preference and taste of a mobile terminal user in a mobile broadcast system.

Moreover, the exemplary embodiments of the present invention can efficiently allocate decoding buffers of a mobile terminal according to the number of preference channels.

Moreover, the exemplary embodiments of the present invention can reduce a delay time when a channel change is made between preference channels by allowing a mobile terminal user to directly select a preference channel and manage the selected preference channel within a mobile terminal in a mobile broadcast system based on LASeR in which multiple logical channels are multiplexed into one physical channel.

While the invention has been shown and described with reference to certain exemplary embodiments thereof, it will be understood by those skilled in the art that various changes in form and detail may be made therein without departing from the spirit and scope of the invention as defined by the appended claims and their equivalents.

What is claimed is:

1. A method for managing a preference channel in a mobile broadcast system, the method comprising:

receiving multiplexed logical channels on which data streams are transmitted from a service provider to a mobile terminal through a communication network;

demultiplexing the multiplexed logical channels;

dynamically allocating preference channels among the demultiplexed logical channels to decoding buffers using preference channel description information;

computing a decoding time of an elementary stream in each decoding buffer;

decoding an elementary stream in each corresponding one of the preference channels by a single decoder based on the decoding time; and composing the decoded elementary streams of logical channels with a media, wherein the preference channel description information comprises the number of preference channels selected by a mobile terminal user;

wherein a first decoding time is computed based on a start time and a slot time, and an n-th decoding time is computed based on a (n−1)-th decoding time and a period time; and wherein the start time is a time at which a first access unit (AU) starts to be decoded, the period time is a period of a time required to decode each elementary stream included in a source list once, and the slot time is a decoding time allocated to each elementary stream.

2. The method of claim 1, wherein the preference channel description information further comprises the channel-by-channel stream identifiers (IDs) and a user preference.

3. The method of claim 1, wherein the preference channel description information comprises at least one of a unique identifier of each video stream and a user preference indicating a value of a preference for a channel.

4. The method of claim 1, wherein the first decoding time is computed by equation $DT_0(S1)=startTime+slotTime(0)$ and an associated decoding time is computed by equation $DT_n(S1)=DT_{n-1}+periodTime$, where $DT_0$ is the first decoding time, startTime is a time at which a first access unit (AU) starts to be decoded, slotTime is a decoding time allocated to each elementary stream, $DT_n$ is an n-th decoding time, $DT_{n-1}$ is a (n−1)-th decoding time, periodTime is a period time required to decode each elementary stream included in a source list once, and S1 is a stream.

5. The method of claim 1, wherein the decoding operation is performed during a slot time of an associated stream in each decoding buffer at a decoding time.

6. The method of claim 1, wherein the service provider comprises a server of a broadcast provider.

7. The method of claim 1, wherein the logical channels comprise logical channels multiplexed to transmit data streams of the service provider.

8. An apparatus for managing a preference channel in a mobile broadcast system, comprising:

a demultiplexer for receiving multiplexed logical channels on which data streams are transmitted from a service provider to a mobile terminal through a communication network and demultiplexing the multiplexed logical channels;

a preference channel manager for dynamically allocating preference channels among the demultiplexed logical channels to decoding buffers using preference channel description information;

each decoding buffer for computing a decoding time of an elementary stream;

a single decoder for decoding the elementary stream in each corresponding one of the preference channels based on the decoding time; and a compositor for the decoded elementary streams of logical channels with a media;

wherein the preference channel description information comprises the number of preference channels selected by a mobile terminal user;

wherein a first decoding time is computed based on a start time and a slot time, and an n-th decoding time is computed based on a (n−1)-th decoding time and a period time; and wherein the start time is a time at which a first access unit (AU) starts to be decoded, the period time is a period of time required to decode each elementary stream included in a source list once, and the slot time is a decoding time allocated to each elementary stream.

9. The apparatus of claim 8, wherein the preference channel description information further comprises the channel-by-channel stream identifiers (IDs) and a user preference.

10. The apparatus of claim 8, wherein the preference channel description information comprises at least one of a unique identifier of each video stream and a user preference indicating a value of a preference for a channel.

11. The apparatus of claim 8, wherein the first decoding time is computed by equation $DT_0(S1)=startTime+slotTime(0)$ and an associated decoding time is computed by equation $DT_n(S1)=DT_{n-1}+periodTime$, where $DT_0$ is the first decoding time, startTime is a time at which a first access unit (AU) starts to be decoded, slotTime is a decoding time allocated to each elementary stream, $DT_n$ is an n-th decoding time, $DT_{n-1}$ is a (n−1)-th decoding time, periodTime is a period time required to decode each elementary stream included in a source list once, and S1 is a stream.

12. The apparatus of claim 8, wherein the decoder performs the decoding operation during a slot time of an associated stream in each decoding buffer at a decoding time.

13. The apparatus of claim 8, wherein the service provider comprises a server of a broadcast provider.

14. The apparatus of claim 8, wherein the logical channels comprise logical channels multiplexed to transmit data streams of the service provider.

* * * * *